United States Patent [19]
Bright

[11] Patent Number: 5,157,394
[45] Date of Patent: Oct. 20, 1992

[54] DATA ACQUISITION SYSTEM WITH MULTIPLE SIMULTANEOUS SAMPLE RATES OBTAINED FROM A SINGLE ANALOG-TO-DIGITAL CONVERTER

[76] Inventor: James A. Bright, 5721 S. Hanover Way, Englewood, Colo. 80111

[21] Appl. No.: 276,134

[22] Filed: Nov. 25, 1988

[30] Foreign Application Priority Data

Nov. 30, 1987 [FR] France ............................. 87 16550

[51] Int. Cl.⁵ .............................................. H03M 1/00
[52] U.S. Cl. ....................................... 341/122; 364/726
[58] Field of Search ................. 341/122, 123, 157; 364/726

[56] References Cited
U.S. PATENT DOCUMENTS 3,883,726  5/1975  Schmidt .............................. 364/726
4,665,494  5/1987  Tanaka et al. ...................... 341/122
4,797,923  1/1989  Clarke ................................ 364/726
4,833,445  5/1989  Buchele ............................. 341/122

Primary Examiner—Todd E. Deboer
Assistant Examiner—Marc S. Hoff
Attorney, Agent, or Firm—Hill, Van Santen, Steadman & Simpson

[57] ABSTRACT

A data acquisition system which utilizes a fixed frequency anti-aliasing filter and an analog-to-digital converter which operates at a fixed sample rate and a Fourier transform generator and a transform truncator and an inverse transform generator so as to provide sample data output at rates lower than the analog-to-digital converter sampling rate. By using multiple transform truncators and multiple inverse transform generators which simultaneously operate, multiple sample data outputs can be obtained which are free of aliasing phenomena.

3 Claims, 1 Drawing Sheet

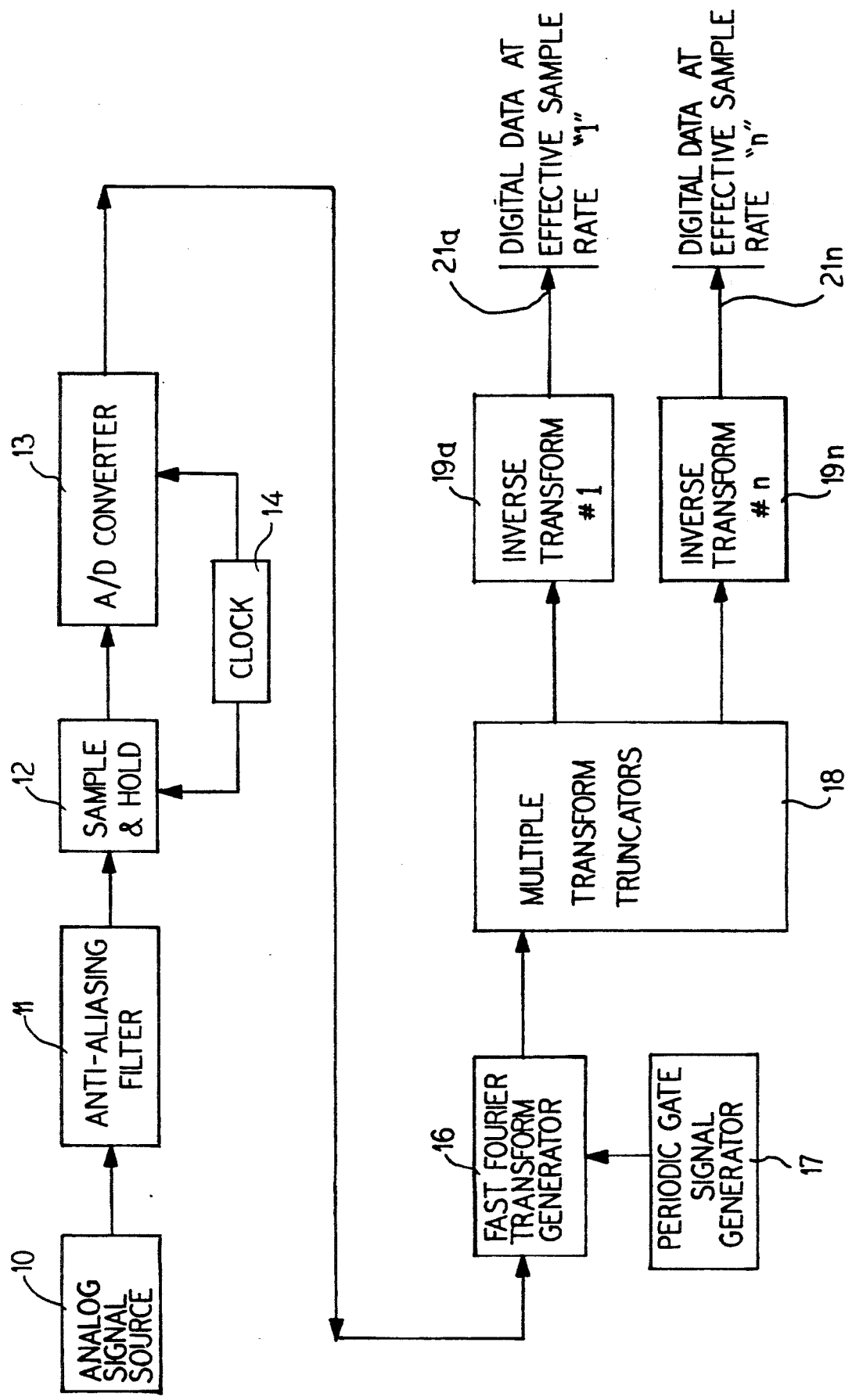

DATA ACQUISITION SYSTEM WITH MULTIPLE SIMULTANEOUS SAMPLE RATES OBTAINED FROM A SINGLE ANALOG-TO-DIGITAL CONVERTER

BACKGROUND OF THE INVENTION

1. Field of the Invention

This invention relates in general to a digital acquisition system and specifically to a novel data acquisition system which can simultaneously acquire data at a number of "effective" sampling rates using only a single analog-to-digital converter.

2. Description of the Prior Art

It is known to convert an analog signal by passing it through an anti-aliasing filter and then to sample and hold it at a sampling rate fs and then pass the sampled signal to an analog-to-digital converter. A clock supplies an input to the sample and hold circuit and to the analog to digital converter and causes the sample and hold gate to periodically sample the input signal at a sampling rate fs. The sample signal level is held until the analog-to-digital converter converts the signal to a digital value. This sampling process can result in what is called aliasing beat frequencies on any analog signal containing frequencies which are higher than one-half of the sampling rate fs. This is the reason that an aliasing filter is used prior to the sample and hold device so as to remove frequencies higher than one-half the sample rate.

It is necessary to change the anti-aliasing filter cut-off frequency whenever the sampling rate is changed so as to prevent aliasing.

Thus, the prior art data acquisition system is not capable of operating at multiple sampling rates with a fixed anti-aliasing filter.

SUMMARY OF THE INVENTION

It is an object of the present invention to provide a data acquisition system in which simultaneous multiple sampling rates from a single analog-to-digital converter can effectively be produced.

It is a feature of the present invention to process the output of a prior art digital data acquisition system by providing a fast Fourier transform generator which receives periodic gate signals to control the interval over which the transforms are generated which supplies an output to multiple transform truncators which supply a plurality of outputs to a plurality of inverse transform devices which produce outputs of digital data which are sampled at different effective sampling rates.

An object of the invention is to provide data which is completely free from aliasing on numerous simultaneous outputs each of which have different "effective" sampling rates while using only a single analog-to-digital converter which operates at a fixed sample rate.

The invention provides a number of serial outputs at different sampling rates all in parallel and simultaneously with one analog-to-digital converter and one fixed frequency anti-aliasing filter.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWING

The FIGURE is a block diagram of the data acquisition system of the invention.

DESCRIPTION OF THE PREFERRED EMBODIMENTS

The FIGURE illustrates an analog signal source 10 which supplies an output to an anti-aliasing filter 11 which supplies an output to a sample and hold device 12 which in turn supplies an output to an analog-to-digital converter 13. A clock 14 supplies inputs to control the sample and hold device 12 and the analog-to-digital converter 13. The clock 14 causes the sample and hold gate 12 to periodically sample the input signal at a sampling rate of fs. The sample signal level is held until the analog-to-digital converter 13 converts the signal to a digital value. The sampling process can result in aliasing which are beat frequencies on any analog signal containing frequencies higher than one-half the sampling rate fs. Thus, the anti-aliasing filter is used before the sample and hold device 12 so as to remove frequencies which are higher than one-half the sampling rate.

The components 10–14 form a conventional form of a prior art data processing system. The present invention supplies the output of the analog-to-digital converter 13 to a fast Fourier transform generator 16 which receives periodic gate signals from a periodic gate signal generator 17. The output of the fast Fourier transform generator 16 is supplied to multiple transform truncators 18 which truncates the incoming frequency spectrum beyond all frequencies components which exceed two times the effective sampling rate desired. The outputs of the multiple transform truncators are supplied to a plurality of inverse transform devices 19a through 19n which compute the inverse Fourier transform. The output of each of the inverse transform devices 19a through 19n are respectively supplied to output terminals 21a through 21n which carry the digital data at different effective sample rates corresponding to the effective sample rate of the inverse transform devices 19a through 19n.

In prior art devices it is necessary to change the anti-aliasing filter cut-off frequency whenever the sample rate is changed so as to prevent aliasing.

In the present invention, the digital conversion system consisting of the anti-aliasing filter 11, sample and hold device 12 and the analog-to-digital converter 13 operate at a fixed sample rate corresponding to the highest sample rate selection that may be required in a given data or acquisition system. If this sampling rate is 30 KHz, the anti-aliasing filter 11 should provide sufficient attenuation at 15 KHz so that objectionable aliasing does not occur. The digital signal at the output of the analog-to-digital converter 13 is accumulated in the transform generator 16 over the interval of the gate signal from the gate generator 17 and processed so as to output a frequency spectrum once each cycle of the gate signal.

This frequency spectrum is then truncated beyond all frequency components exceeding two times the "effective" sample rate desired. This truncated spectrum is then passed through the devices 19a through 19n which compute the inverse Fourier Transform. The output of the inverse transform devices 19a through 19n will comprise sampled values at new and lower sample rates than that of the original analog-to-digital converter without the features of the invention. This new and lower sample rate is the "effective" sample rate and is free of aliasing components. Any desired number of such outputs can be simultaneously generated to produce outputs at any number of "effective" sample rates.

Thus, the present invention makes it possible to obtain data completely free from aliasing on numerous simultaneous outputs each at different "effective" sample rates while using only a single analog-to-digital converter 13 and one fixed frequency anti-aliasing filter 11.

The system of the invention is useful in digital data systems used to capture disturbance data on electrical power transmission systems, for example. In such systems, it is desirable to capture long term disturbances at very low sample rates and to simultaneously capture short term high-frequency transients at much higher sample rates. There are actually at least four useful sample rates for capturing disturbances for transients, fault clearings, dynamic swings and cascading effects. Each of these phenomena occur over different time intervals while data of interest is also over different frequency ranges. In addition, some of these phenomena may occur in combination. Thus, it is desirable to simultaneously sample and acquire data separately for each phenomena using sample rates best suited for the data of interest for each phenomena. This is a unique requirement for data acquisition and occurs particularly in electrical power systems.

The present invention allows the use of a fixed frequency anti-aliasing filter and an analog-to-digital converter to obtain sample data output at rates lower than that of the analog-to-digital converter.

According to the sampling theorum, all the information in an analog signal can be recovered by sampling it at twice the highest frequency component in the signal. Thus, if the highest frequency component that carries information is 15 KHz, a sampling rate of 30 KHz will allow all information in the signal to be recovered.

The anti-aliasing filter 11 may be a low pass filter. The fast Fourier transform generator 16 is available as a Texas Instruments Digital Signal Processing chip. The multiple transform truncators 18 may comprise a type 8080 microprocessor with a suitable program. The inverse transform devices 19a -19n may be type 8080 microprocessors with suitable programs.

Although the invention has been described with respect to preferred embodiments, it is not to be so limited as changes and modifications can be made which are within the full intended scope of the invention as defined by the appended claims.

I claim as my invention:

1. A digital data acquisition system comprising, a low pass anti-aliasing filter which passes signals having frequencies below one-half a sampling rate, a sample and hold device which operates at the sampling rate which receives the output of said anti-aliasing filter, an analog to digital converter which receives the output of said sample and hold device, a clock which supplies inputs to said sample and hold device and said analog-to-digital converter, a fast Fourier transform generator which receives the output of said analog to digital converter, at least one transform truncator means which receives the output of said fast Fourier transform generator, at least one inverse transform means which receives an output from said transform truncator means and produces digital data at a first effective sampling rate, and a gate signal generator which supplies an input to said fast Fourier transform generator, wherein said transform truncator means comprises a plurality of transform truncators, and said inverse transform means comprises a plurality of inverse transform devices each of which receives an input from a respective one of said plurality of transform truncators and each of which produces digital data at a different effective sampling rate.

2. A digital data acquisition system according to claim 1 wherein said output of said fast Fourier transform generator is stored in a memory prior to subsequent signal processing.

3. A digital data acquisition system according to claim 1 wherein said output from said transform truncators are stored in a memory prior to subsequent signal processing.

* * * * *